(12) United States Patent
Mondal et al.

(10) Patent No.: US 10,198,385 B2
(45) Date of Patent: Feb. 5, 2019

(54) SYSTEM AND METHOD FOR DETECTING TYPES OF STORAGE DRIVES CONNECTED TO BACKPLANE CONTROLLER OR ENCLOSURE MANAGEMENT CONTROLLER

(71) Applicant: American Megatrends, Inc., Norcross, GA (US)

(72) Inventors: Umasankar Mondal, Snellville, GA (US); Shibu Abraham, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 213 days.

(21) Appl. No.: 15/457,206

(22) Filed: Mar. 13, 2017

(65) Prior Publication Data

US 2018/0260349 A1 Sep. 13, 2018

(51) Int. Cl.
*G06F 13/16* (2006.01)
*G06F 13/366* (2006.01)
*G06F 13/40* (2006.01)
*G06F 13/42* (2006.01)

(52) U.S. Cl.
CPC ............ *G06F 13/366* (2013.01); *G06F 13/16* (2013.01); *G06F 13/4068* (2013.01); *G06F 13/4282* (2013.01); *G06F 2213/0026* (2013.01); *G06F 2213/0028* (2013.01); *G06F 2213/0032* (2013.01)

(58) Field of Classification Search
None
See application file for complete search history.

(56) References Cited

U.S. PATENT DOCUMENTS

| | | | | |
|---|---|---|---|---|
| 2005/0182874 A1* | 8/2005 | Herz | ...................... | G06F 13/385 710/74 |
| 2009/0274027 A1* | 11/2009 | Tanaka | ................. | G11B 19/209 369/47.55 |
| 2012/0151112 A1* | 6/2012 | Paul | ..................... | G06F 13/4072 710/304 |
| 2015/0067256 A1* | 3/2015 | Nakajima | ............... | G06F 3/061 711/114 |

\* cited by examiner

*Primary Examiner* — Ilwoo Park
(74) *Attorney, Agent, or Firm* — Locke Lord LLP; Tim Tingkang Xia, Esq.

(57) ABSTRACT

Systems and methods for detecting types of storage drives connected to a controller, which performs backplane or enclosure management. The controller has multiple pins, which includes N analog pins, such as the PRSNT# pins. Each of the N analog pins is electrically connected to a corresponding detecting circuits. Further, 2*N storage drives may be connected to and controlled by the controller in a way such that each analog pin may be connected to two storage drives via a corresponding detecting circuit for detecting a drive type of each storage drive. Each storage drive may be a SATA/SAS storage drive, or a NVMe storage drive. In operation, the controller receives a voltage from each of the N analog pins, and determines the drive type of each of the two of the 2*N storage drives based on the voltage received from each of the N analog pins.

20 Claims, 7 Drawing Sheets

| VDD | Drive Type of Drive #0 | Drive Type of Drive #1 | Voltage received at the PRSNT0-1 pin |
|---|---|---|---|
| 3.3V (+/- 10%) | First Type (SATA/SAS) | First Type (SATA/SAS) | 1.885V |
| | Second Type (NVMe) | Second Type (NVMe) | 2.17V |
| | Second Type (NVMe) | First Type (SATA/SAS) | 2.64V |
| | Second Type (NVMe) | Second Type (NVMe) | 3.3V |

FIG. 6

SYSTEM AND METHOD FOR DETECTING TYPES OF STORAGE DRIVES CONNECTED TO BACKPLANE CONTROLLER OR ENCLOSURE MANAGEMENT CONTROLLER

FIELD

The present disclosure relates generally to backplane and enclosure management technology, and more particularly to systems and methods for detecting types of storage drives connected to a controller, such as a backplane controller or an enclosure management controller, using fewer pins of the controller.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a data center with large amount of storage space, a backplane may be used to mount a number of storage drives in an enclosure. To management the operation of the backplane system, a backplane (BP) controller or an enclosure management (EM) controller may be provided. Generally, in a BP controller or an EM controller, a lot of pins are needed to efficiently manage the drives. With the advent of Non-Volatile Memory Express (NVMe) solid-state drives (SSDs) in the enterprise server market, the modern backplane system generally has a combination of Serial Attached SCSI (SAS)/Serial AT Attachment (SATA) hard disk drives (HDDs) and NVMe SSDs. Thus, it has become necessary to find an efficient way to manage these drives through an EM or BP controller using the limited numbers of pins on the controller.

Therefore, an unaddressed need exists in the art to address the aforementioned deficiencies and inadequacies.

SUMMARY

Certain aspects of the disclosure direct to a method for detecting types of storage drives connected to a controller, which includes: providing a backplane enclosure system including: a controller, including a plurality of pins, wherein the pins include N analog pins, and N is a positive integer; N detecting circuits, each being electrically connected to a corresponding one of the N analog pins of the controller; and 2*N storage drives configured to be connected to and controlled by the controller, wherein each of the N analog pins is configured to be connected to two of the 2*N storage drives via a corresponding one of the detecting circuits for detecting a drive type of each of the two of the 2*N storage drives; receiving, by the controller, a voltage from each of the N analog pins; and determining, by the controller, the drive type of each of the two of the 2*N storage drives based on the voltage received from each of the N analog pins.

In certain embodiments, the controller is a backplane controller or an enclosure management controller.

In certain embodiments, each of the N analog pins is a PRSNT# pin, and each of the 2*N storage drives has a PRSNT# pin being electrically connected to one of the N PRSNT# pins of the controller via the corresponding detecting circuit.

In certain embodiments, each of the 2*N storage drives is a first type storage drive or a second type storage drive, wherein the PRSNT# pin of the first type storage drive is grounded, and the PRSNT# pin of the second type storage drive is in a no-connect status and floating.

In certain embodiments, the first type storage drive is a Serial AT Attachment (SATA) or Serial Attached SCSI (SAS) storage drive, and the second type storage drive is a Non-Volatile Memory Express (NVMe) storage drive.

In certain embodiments, for each of the N analog pins, the corresponding detecting circuit includes: a first resistor having a first end electrically connected to the analog pin, and a second end electrically connected to a voltage source providing a positive voltage; a second resistor having a first end electrically connected to the analog pin, and a second end configured to be electrically connected to the PRSNT# pin of a first storage drive connected to the analog pin via the corresponding detecting circuit; and a third resistor having a first end electrically connected to the analog pin, and a second end configured to be electrically connected to the PRSNT# pin of a second storage drive connected to the analog pin via the corresponding detecting circuit. In one embodiment, the third resistor has a greater resistance than that of the second resistor, and the second resistor has a greater resistance than that of the first resistor.

In certain embodiments, for each of the N analog pins, the drive type of each of the two of the 2*N storage drives are determined based on the voltage received from the analog pins by: when the voltage received is the positive voltage, determining each of the first storage drive and the second storage drive as the second type storage drive; when the voltage received is a first voltage smaller than the positive voltage, determining each of the first storage drive and the second storage drive as the first type storage drive; when the voltage received is a second voltage between the first voltage and the positive voltage, determining the first storage drive as the first type storage drive, and the second storage drive as the second type storage drive; and when the voltage received is a third voltage between the second voltage and the positive voltage, determining the first storage drive as the second type storage drive, and the second storage drive as the first type storage drive.

In certain embodiments, the resistance of the first resistor is 1K ohm; the resistance of the second resistor is 2K ohm; the resistance of the third resistor is 4K ohm; the positive voltage is about 3.3V; the first voltage is about 1.885V; the second voltage is about 2.17V; and the third voltage is about 2.64V.

In certain embodiments, the pins of the controller further include 2*N Mx pins, and each of the 2*N storage drives has a GND/IFDET# pin being electrically connected to one of the 2*N Mx pins of the controller via a reference circuit for detecting presence of the storage drive, wherein the GND/IFDET# pin of each of the 2*N storage drives is grounded.

In certain embodiments, the method further includes: for each of the 2*N Mx pins, determining, by the controller, presence of a corresponding storage drive based on an input to the Mx pin by: when the input to the Mx pin is a positive query voltage, determining that a corresponding storage drive is present; and when the Mx pin receives no query voltage, determining that the corresponding storage drive is not present.

In certain embodiments, each of the 2*N storage drives further has a RDYLED pin being electrically connected to one of the 2*N Mx pins of the controller via the reference circuit for detecting activity of the storage drive, wherein for each of the 2*N Mx pins, the reference circuit includes: a first 10K ohm resistor having a first end electrically connected to the Mx pin, and a second end; a second 10K ohm resistor having a first end electrically connected to the Mx pin, and a second end configured to be electrically connected to the GND/IFDET# pin of the corresponding storage drive; and a third 10K ohm resistor having a first end electrically connected to the Mx pin, and a second end configured to be electrically connected to the RDYLED pin of the corresponding storage drive, wherein when the corresponding storage drive is present, the second end of the first 10K ohm resistor is electrically connected to a voltage source providing a voltage of about +3.3V, the second end of the second 10K ohm resistor is electrically connected to the GND/IFDET# pin of the corresponding storage drive, and the second end of the third 10K ohm resistor is electrically connected to the RDYLED pin of the corresponding storage drive; and when the corresponding storage drive is not present, the second end of the first 10K ohm resistor is grounded.

Certain aspects of the disclosure direct to a system, which includes: a controller comprising a processor, a plurality of pins, and a memory storing computer executable code, wherein the pins include N analog pins, and N is a positive integer; N detecting circuits, each being electrically connected to a corresponding one of the N analog pins of the controller; and 2*N storage drives configured to be connected to and controlled by the controller, wherein each of the N analog pins is configured to be connected to two of the 2*N storage drives via a corresponding one of the detecting circuits for detecting a drive type of each of the two of the 2*N storage drives. The computer executable code, when executed at the processor, is configured to: receive a voltage from each of the N analog pins; and determine, based on the voltage received from each of the N analog pins, the drive type of each of the two of the 2*N storage drives.

In certain embodiments, each of the 2*N storage drives is a first type storage drive or a second type storage drive; the first type storage drive is a SATA or SAS storage drive; the second type storage drive is a NVMe storage drive; the PRSNT# pin of the first type storage drive is grounded; and the PRSNT# pin of the second type storage drive is in a no-connect status and floating.

In certain embodiments, for each of the N analog pins, the computer executable code is configured to determine the drive type of each of the two of the 2*N storage drives based on the voltage received from the analog pins by: when the voltage received is the positive voltage, determining each of the first storage drive and the second storage drive as the second type storage drive; when the voltage received is a first voltage smaller than the positive voltage, determining each of the first storage drive and the second storage drive as the first type storage drive; when the voltage received is a second voltage between the first voltage and the positive voltage, determining the first storage drive as the first type storage drive, and the second storage drive as the second type storage drive; and when the voltage received is a third voltage between the second voltage and the positive voltage, determining the first storage drive as the second type storage drive, and the second storage drive as the first type storage drive.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 6 depicts a reference table of the detecting circuit showing the voltage received at the PRSNT0-1 pin of the controller and the drive types of the storage drives according to certain embodiments of the present disclosure.

DETAILED DESCRIPTION

Figure 1:
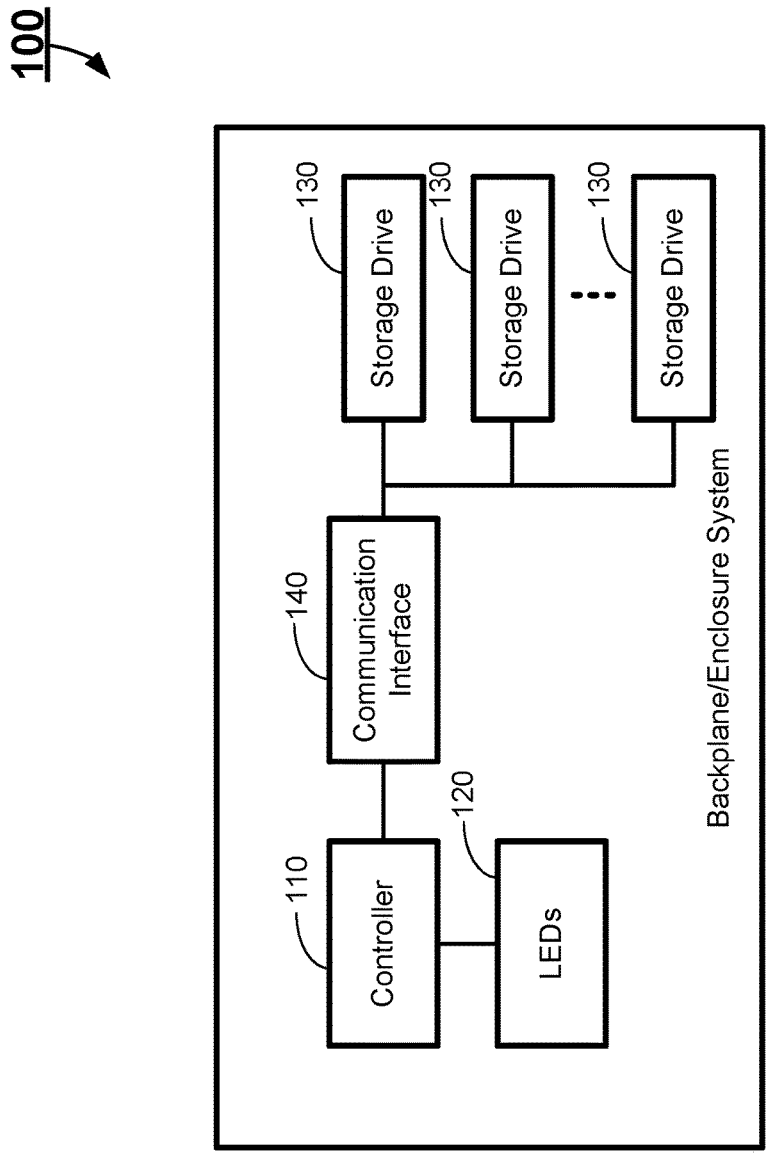
FIG. 1 schematically depicts a block diagram of a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, with the advent of NVMe SSDs in the enterprise server market, the modern backplane system generally has a combination of SAS/SATA HDDs and NVMe SSDs. Thus, it has become necessary to find an efficient way to manage these drives through an EM or BP controller using the limited numbers of pins on the controller. Typically, for each storage drive being connected to the controller, a corresponding pin is required for performing management of the storage drive. In this case, a lot of pins are needed to efficiently manage these storage drives. Accordingly, certain aspects of the disclosure relate to a method for detecting types of storage drives connected to a controller, which allows two storage drives to share one pin for detecting the drive types of the two storage drives, thus reducing the total number of pins required to detect the drive types (NVMe or non-NVMe) of the storage drives by a factor of 2 or more.

In view of the aforementioned problems, certain aspects of the disclosure relate to a system for detecting types of storage drives connected to a controller. FIG. 1 schematically depicts a block diagram of a system according to certain embodiments of the present disclosure. As shown in FIG. 1, the system 100 is a backplane/enclosure system, which includes a controller 110, a plurality of light emitting diodes (LEDs) 120, and a plurality of storage drives 130. Further, each of the storage drives 130 is in connection with the controller 110 via a communication interface 140. In certain embodiments, the system 100 may include other components not shown in the figure.

The controller 110 is a controller controlling the operation of the backplane/enclosure system 100. In certain embodiments, the controller 110 may be a backplane controller or an enclosure management controller. In certain embodiments, examples of the controller 110 may include a microcontroller based controller, a complex programmable logic device (CPLD) based controller, a field-programmable gate array (FPGA) based controller, or any combination thereof. For example, the controller 110 may be a MG9094 controller provided by American Megatrends Inc., which is a low-cost, ultra-small, single-chip solution for enclosure management that supports up to 8 storage drives 130 per backplane, including the SAS/SATA/NVMe storage drives, and cascaded controllers can support up to 32 storage drives. Details of the MG9094 controller may be found the data sheet and related documents of the MG9094 controller.

Figure 2:
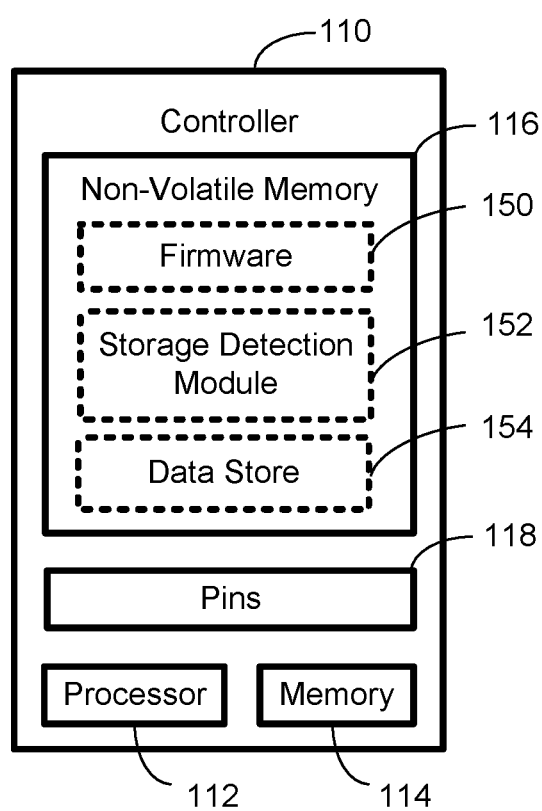
FIG. 2 schematically depicts a block diagram of the controller according to certain embodiments of the present disclosure.

FIG. 2 schematically depicts a block diagram of the controller according to certain embodiments of the present disclosure. As shown in FIG. 2, the controller 110 includes a processor 112, a volatile memory 114, a plurality of pins 116, and a non-volatile memory 118 storing necessary computer executable code and applications of the controller 110, such as firmware 150, a storage detection module 152 and a data store 154.

The processor 112 is the processing core of the controller 110, configured to control operation of the controller 110. In certain embodiments, the processor 112 may execute any computer executable code or instructions stored in the non-volatile memory 118 of the controller 110, such as the firmware 150 and the storage detection module 152. In certain embodiments, the controller 110 may run on more than one processor 112, such as two processors, four processors or eight processors.

The volatile memory 114 can be the random-access memory (RAM) for storing the data and information during the operation of the controller 110. In certain embodiments, the controller 110 may run on more than one volatile memory 114.

The pins 116 are the bare connectors that are used as interfaces to communicate with the communication interface 140. In certain embodiments, the pins 116 may constitute a part of the communication interface 140. It should be noted that different controllers 110 may have different sets of pins 116. For example, a MG9094 controller provides a total of 48 pins. In certain embodiments, some of the pins 116 may be provided for certain designated use. For example, the pins 116 of the controller 110 may include multiple analog pins, which may be used for detecting the presence and the drive types of the storage drives based on the voltage received from each of the analog pins. Details of the use of these pins 116 will be described later.

The non-volatile memory 118 is a non-volatile data storage media for storing the necessary computer executable code and applications of the controller 110, such as the firmware 150 and the storage detection module 152. Examples of the non-volatile memory 118 may include flash memory, non-volatile random-access memory (NVRAM), memory cards, USB drives, or any other types of data storage devices suitable for the controller 110. In certain embodiments, the controller 110 may run on more than one non-volatile memory 118.

The firmware 150 stored in the non-volatile memory 118 includes the computer executable code that may be executed at the processor 112 to enable the operations of the controller 110. In certain embodiments, the firmware 150 may include one or more modules or software components that may be executed independently. In certain embodiments, the storage detection module 152 and the data store 154 may be a part of the firmware 150. In certain embodiments, each of the storage detection module 152 and the data store 154 may respectively be a separate software module independent from the firmware 150.

The storage detection module 152 is a software application configured to detect the drive type of each of the storage drives 130 connected to the controller 110 via the communication interface 140. In particular, the controller 110 may allow two storage drives 130 to share one analog pin for detecting the drive types of the two storage drives 130. In certain embodiments, when the controller 110 receives a voltage from a corresponding analog pin for detecting the drive types of the two storage drives 130 connected to the analog pin, the storage detection module 152 may determine the drive type of each of the two storage drives 130 based on the voltage received from the analog pin. In certain embodiments, the storage detection module 152 may receive the voltage received from the analog pin, and compare the voltage with a list of predetermined voltage values stored in the data store 154. Based on the comparison result, the storage detection module 152 may determine the drive type of each of the two storage drives 130.

The data store 154 is a database for storing the data for the storage type detection process and other necessary data of the firmware 150. In certain embodiments, the data stored in the data store 154 may include, without being limited to, a table listing the drive types of the storage drives 130, the predetermined voltage values, and other reference data that may be used by the storage detection module 152 to determine the drive type of each of the two storage drives 130.

Referring back to FIG. 1, the LEDs 120 are display lights being used to display the state of the storage drives 130. Each of the LEDs 120 may be switchable between an ON state (i.e., the LED is on) and an OFF state (i.e., the LED is off), and may be controlled by the controller 110 to perform blinking to indicate the states of the storage drives 130. In certain embodiments, some or all of the LEDs 120 may form a virtual LED matrix, such that each row or each column of the LEDs 120 may correspond to one of the storage drives 130. It should be particularly noted that the virtual LED matrix is "virtual" because the LEDs 120 does not need to be physically arranged in a matrix arrangement. In other words, the LEDs 120 are arranged in the virtual LED matrix as a logical matrix, but the physical arrangement of the LEDs 120 may be in a non-matrix arrangement. For example, all the LEDs 120 may be physically aligned along a straight line. In certain embodiments, for distinguishing purposes, the LEDs 120 in different rows may be LEDs in different colors, such that a user may easily identify the corresponding drive states being displayed based on the color of the LEDs. For example, the LEDs 120 in the first row of the virtual LED matrix may be green LEDs, the LEDs 120 in the second row of the virtual LED matrix may be red LEDs, and the LEDs 120 in the third row of the virtual LED matrix may be yellow/amber LEDs. In certain embodiments, other combinations of the LEDs 120 by types, colors, size and/or shape may be used for distinguishing purposes.

The storage drives 130 are non-volatile storage media being controlled by the controller 110. In certain embodiments, the backplane/enclosure system 100 may have slots for the storage drives 130 to be installed therein, such that each of the storage drives 130 is communicatively connected to and controlled by the controller 110 via the communication interface 140. Typically, a plurality of storage drives 130 may be provided in a backplane/enclosure system 100, and each of the storage drives 130 may be designated with a label D(0), D(1), . . . , D(N−1), such that each storage drive 130 may correspond to a plurality of the LEDs 120. In certain embodiments, each of the storage drives 130 may be a HDD, a SSD, or any other types of storage media which may be controlled by the controller 110. For example, the drive types of the storage drives 130 may be categorized by two different types, including a first type storage drive (such as the SATA or SAS storage drive) and a second type storage drive (such as the NVMe storage drive). It should be noted that, in some cases, some of the slots for the storage drives 130 may be empty (i.e., without a storage drive being installed therein).

Figure 3:
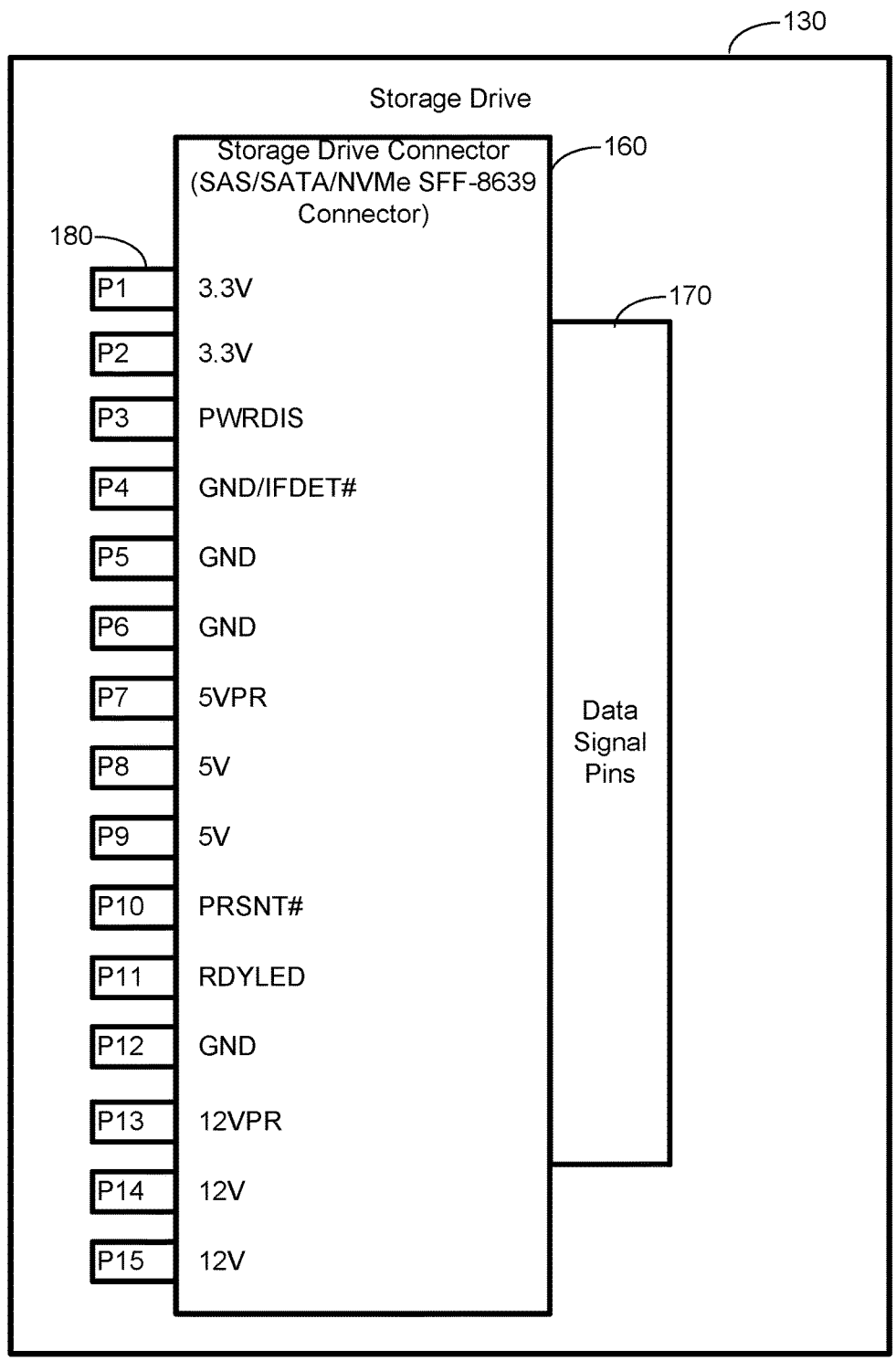
FIG. 3 schematically depicts a storage drive having a corresponding SFF-8639 storage drive connector according to certain embodiments of the present disclosure.

FIG. 3 schematically depicts a storage drive having a corresponding SFF-8639 storage drive connector according to certain embodiments of the present disclosure. In particular, the storage drive 130 as shown in FIG. 3 may be a SAS/SATA HDD or a NVMe SSD, which uses a SFF-8639 storage drive connector 160 that supports SATA, SAS, and NVMe storage drives. As shown in FIG. 3, the SFF-8639 storage drive connector 160 includes a plurality of data signal pins 170, and 15 analog pins 180 for connecting the communication interface 140. In certain embodiments, each of the 15 analog pins 180 has its designated use. For example, among the 15 analog pins 180, the pin P4 is a GND/IFDET# pin, and the pin P11 is a RDYLED pin, which may generally be used for storage presence and activity detection purposes.

Referring back to FIG. 1, the communication interface 140 is an interface, which may be formed by a plurality of circuits for connecting the storage drives 130 to the controller 110. The circuits of the communication interface 140 may be changed based on the need of the storage detection process.

As discussed above, in certain embodiments, SFF-8639 or U2 connector may be use in modern backplanes to connect 2.5" form factor SAS or SATA or NVMe (PCIe) drives. In certain embodiments, when the controller 110 is a MG9094 controller (or other AMI controllers in the MG90xx series), the controller 110 may leverage the use of power signals on the SAS/SATA/NVMe SSD drive connector (SFF-8639) to detect the presence and activity of the storage drive. For example, the power pin P4 (GND/IFDET#) of the analog pins 180 of the SFF-8639 connector of the storage drive 130 may be used to be connected to a Mx (Mated) pin of the pins 118 on the MG9094 controller, such that the MG9094 controller may detect the presence of the storage drive 130 using the Mx pin 118. In another example, the pin P11 of the analog pins 180 of the SFF-8639 connector of the storage drive 130 may be used to be connected to the Mx pin on the MG9094 controller, such that the MG9094 controller may detect the activity of the storage drive 130 using the Mx pin 118, and control the corresponding activity LED of the MG9094 controller to blink and show the activity of the storage drive 130.

Figure 4:
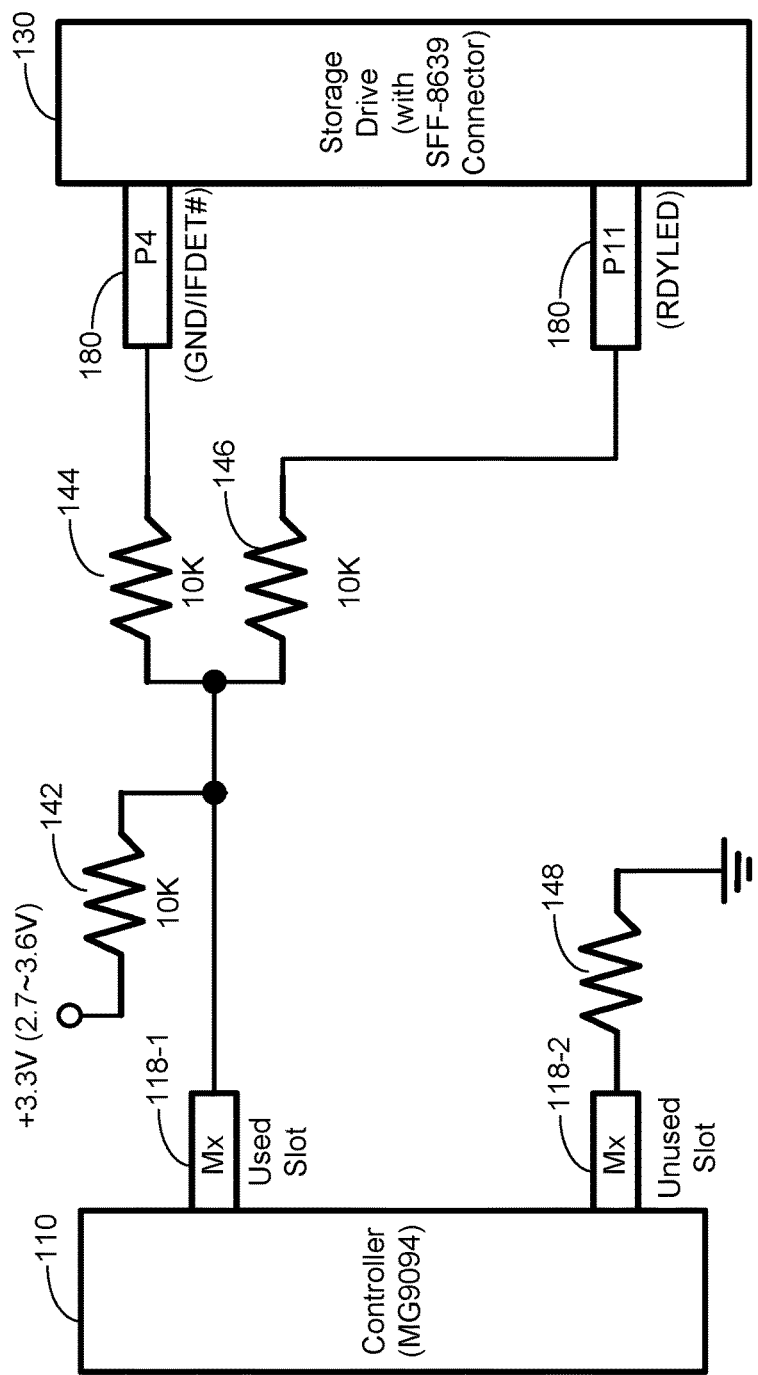
FIG. 4 schematically depicts an exemplary reference circuit of the communication interface according to certain embodiments of the present disclosure.

FIG. 4 schematically depicts an exemplary reference circuit of the communication interface according to certain embodiments of the present disclosure. In particular, FIG. 4 shows a controller 110 and one storage drive 130 being connected by a plurality of circuits formed by multiple resistors 142, 144, 146 and 148, each being a 10K ohm resistor. As shown in FIG. 4, the controller 110 is a MG9094 controller, which has a plurality of Mx pins 118. Further, the storage drive 130 uses a SFF-8639 connector as shown in FIG. 3, which has a power pin P4 (GND/IFDET#) and a pin P11 (RDYLED) for the storage drive 130. In certain embodiments, each storage drive 130 requires a corresponding Mx pin 118. Thus, the MG9094 controller has 8 Mx pins 118 to support up to 8 storage drives 130.

As shown in FIG. 4, the storage drive 130 is connected to a first Mx pin 118-1 of the MG9094 controller 110 via a reference circuit formed by the 3 resistors 142, 144 and 146. Specifically, the reference circuit is formed as a used slot by first 10K ohm resistor 142, a second 10K ohm resistor 144 and a third 10K ohm resistor 146. The first 10K ohm resistor 142 has a first end (the right end as shown in FIG. 4), which is electrically connected to the Mx pin 118-1, and a second end (the left end as shown in FIG. 4), which is electrically connected to a voltage source providing a voltage of about +3.3V. In certain embodiments, the voltage level of the voltage source may be vary, and should be very close to the values obtained for 3.3V+/−10% (such as 2.7-3.6V). The second 10K ohm resistor 144 has a first end (the left end as shown in FIG. 4), which is electrically connected to the Mx pin 118-1, and a second end (the right end as shown in FIG. 4), which is configured to be electrically connected to the pin P4 (GND/IFDET#) of the SFF-8639 connector of the corresponding storage drive 130. The third 10K ohm resistor 146 has a first end (the left end as shown in FIG. 4), which is electrically connected to the Mx pin 118-1, and a second end (the right end as shown in FIG. 4), which is configured to be electrically connected to the pin P11 (RDYLED) of the SFF-8639 connector of the corresponding storage drive 130.

On the other hand, as shown in FIG. 4, the MG9094 controller 110 also includes a second Mx pin 118-2, which is unused (i.e., not connected to a corresponding storage drive). In this case, the reference circuit forms an unused slot. Specifically, only the first 10K ohm resistor 148 of the reference circuit connected to the Mx pin 118-2 is shown in FIG. 4, and the other two 10K ohm resistors are not shown because there is no corresponding storage drive being connected thereto. As shown in FIG. 4, the first end (the left end) of the first 10K ohm resistor 148 is electrically connected to the Mx pin 118-2, and instead of being connected to the voltage source, the second end (the right end) of the first 10K ohm resistor 148 is grounded.

As discussed above, the drive types of the storage drives 130 may be categorized by two different types, including a first type storage drive (such as the SATA or SAS storage drive) and a second type storage drive (such as the NVMe storage drive). Since all SATA/SAS/NVMe storage drives 130 may use the SFF-8639 connectors, each of the first type storage drives (SATA/SAS HDDs) and the second type storage drives (NVMe SSDs) may have the pins P4 (GND/IFDET#) and P11 (RDYLED). In certain embodiments, the pin P4 (GND/IFDET#) on the SFF-8639 connector of each of the SATA/SAS/NVMe storage drives 130 is grounded when the storage drive 130 is installed in the slot, and the pin P11 (RDYLED) may provide voltage signals indicating activity of the storage drive 130. Thus, with the reference circuit as shown in FIG. 4, the MG9094 controller 110 may be capable of detecting the presence and activity of the storage drive 130. However, the MG9094 controller 110 cannot differentiate the drive type of the storage drive based on the voltage received by the Mx pin 118-1.

In order to detect the drive type of the storage drives being connected to the controller, a PRSNT# pin of the pins 118 on the MG9094 controller 110 may be used to connect to the pin P10 (PRSNT#) of the SFF-8639 connector of the corresponding storage drive 130, such that the MG9094 controller may detect the drive type of the storage drive 130 using the PRSNT# pin 118. In certain embodiments, for the first type storage drives (SATA/SAS HDDs), the pin P10 (PRSNT#) is grounded, and for the second type storage drives (NVMe SSDs), the pin P10 (PRSNT#) is in a no-connect status and floating. In a normal way of detecting the drive types of the storage drives 130, each PRSNT# pin of the MG9094 controller 110 is required for one storage drive 130. In this case, the MG9094 controller 110 must have 8 PRSNT# pins 118 to support up to 8 storage drives 130. However, with the involvement of a detecting circuit, each o PRSNT# pin of the MG9094 controller 110 may be connected to two corresponding storage drives 130 via one detecting circuit for detecting the drive type of each of the two storage drives 130. In this case, the MG9094 controller 110 requires only 4 PRSNT# pins 118 and 4 corresponding detecting circuits to support up to 8 storage drives 130. In other words, when the total number of the storage drives 130 is 2*N, the MG9094 controller 110 requires only N PRSNT# pins 118 and N corresponding detecting circuits to support up to 2*N storage drives 130, where N is a positive integer.

Figure 5:
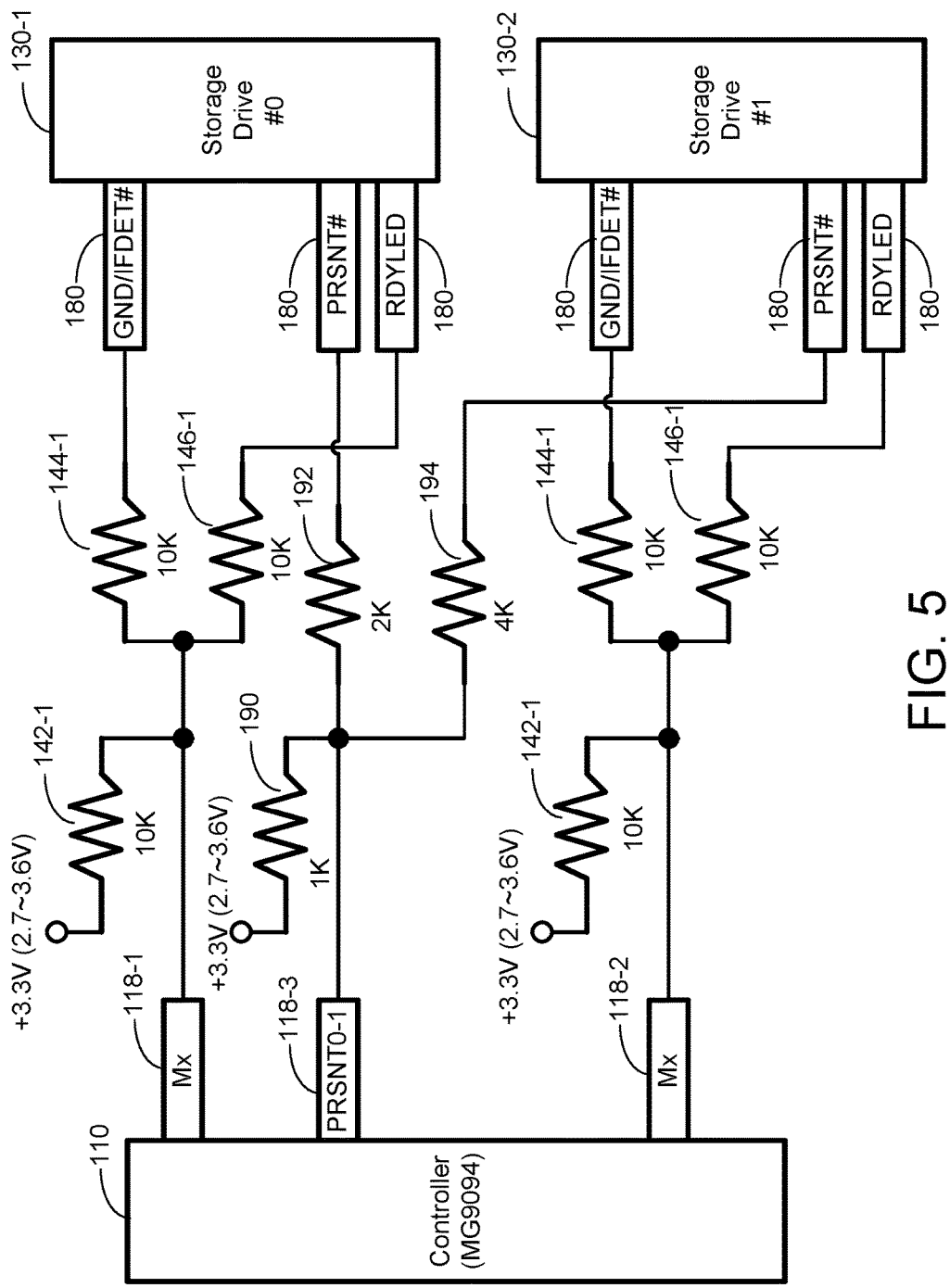
FIG. 5 schematically depicts an exemplary detecting circuit of the communication interface according to certain embodiments of the present disclosure.

FIG. 5 schematically depicts an exemplary detecting circuit of the communication interface according to certain embodiments of the present disclosure. In particular, FIG. 5 shows a controller 110 and two storage drive 130 being connected by a plurality of circuits formed by resistors, including two reference circuits and one detecting circuits. As shown in FIG. 5, the controller 110 is a MG9094 controller, which has two Mx pins 118-1 and 118-2, and one PRSNT# pin 118-3. Further, each of the storage drives 130 uses a SFF-8639 connector as shown in FIG. 3, which has a power pin P4 (GND/IFDET#), a pin P10 (PRSNT#) and a pin P11 (RDYLED) for the storage drive 130. For differentiation purposes, one of the two storage drives 130 is labeled as a storage drive #0, or a first storage drive 130-1; and the other of the two storage drives 130 is labeled as a storage drive #1, or a second storage drive 130-2. Each of the storage drives #0 and #1 may be either a first type storage drive (SATA/SAS HDD) or a second type storage drive (NVMe SSD).

As shown in FIG. 5, for each of the storage drives #0 and #1, the pins P4 (GND/IFDET#) and P11 (RDYLED) for the storage drive 130 are connected to a corresponding Mx pin 118-1 and 118-2 of the MG9094 controller 110 via a reference circuit formed by the 3 resistors 142, 144 and 146, as shown in FIG. 4. Further, the pin P10 (PRSNT#) of the storage drive #0 and the pin P10 (PRSNT#) of the storage drive #1 are connected to the PRSNT# pin 118-3 of the MG9094 controller 110 via the detecting circuit, which is formed by 3 resistors 190, 192 and 194. For identification purposes, the PRSNT# pin 118-3 of the MG9094 controller 110 is referred to as the PRSNT0-1 pin 118-3, indicating that this analog pin is used to be connected to both the PRSNT# pins of the storage drives #0 and #1.

Specifically, the detecting circuit is formed by a first resistor 190 of 1K ohm, a second resistor 192 of 2K ohm, and a third resistor 194 of 4K ohm. The first resistor 190 has a first end (the right end as shown in FIG. 4), which is electrically connected to the PRSNT0-1 pin 118-3, and a second end (the left end as shown in FIG. 4), which is electrically connected to a voltage source providing a positive voltage of about +3.3V. In certain embodiments, the voltage level of the voltage source may be vary, and should be very close to the values obtained for 3.3V+/−10% (such as 2.7-3.6V). The second resistor 192 has a first end (the left end as shown in FIG. 4), which is electrically connected to the PRSNT0-1 pin 118-3, and a second end (the right end as shown in FIG. 4), which is configured to be electrically connected to the pin P10 (PRSNT#) of the SFF-8639 connector of the first storage drive 130-1 (i.e., the storage drive #0). The third resistor 194 has a first end (the left end as shown in FIG. 4), which is electrically connected to the PRSNT0-1 pin 118-3, and a second end (the right end as shown in FIG. 4), which is configured to be electrically connected to the pin P10 (PRSNT#) of the SFF-8639 connector of the second storage drive 130-2 (i.e., the storage drive #1). The resistance of the third resistor 194 is 4K ohm, which is greater than that of the second resistor 192 (2K ohm), and the resistance of the second resistor 192 is greater than that of the first resistor (1K ohm).

As discussed above, for the first type storage drives (SATA/SAS HDDs), the pin P10 (PRSNT#) is grounded, and for the second type storage drives (NVMe SSDs), the pin P10 (PRSNT#) is in a no-connect status and floating. Thus, the voltage received by the PRSNT0-1 pin 118-3 of the controller 110 will vary depending on the types of the two storage drives being connected to the PRSNT0-1 pin 118-3 via the detecting circuit, provided that it is known that the two storage drives 130 are present in the slot, which is determined via the input of the Mx pins 118-1 and 118-2.

FIG. 6 depicts a reference table of the detecting circuit showing the voltage received at the PRSNT0-1 pin of the controller and the drive types of the storage drives according to certain embodiments of the present disclosure. In certain embodiments, the data of the reference table are obtained based on the detecting circuit as shown in FIG. 5. In certain embodiments, the data of the reference table may be stored in the data store 154 as shown in FIG. 2 and used by the storage detection module 152 to perform the detection of the drive types of the storage drives 130.

As shown in FIG. 6, the positive voltage of the voltage source is about +3.3V (which may be varied +/−10%). At the PRSNT0-1 pin 118-3 of the controller, when the voltage received is about 1.885V (which is a first voltage smaller than the positive voltage of 3.3V), each of the first storage drive 130-1 (i.e., the storage drive #0) and the second storage drive 130-2 (i.e., the storage drive #1) may be determined as the first type storage drive (i.e., the SATA/SAS HDD). When the voltage received is about 2.17V (which is a second voltage smaller than the positive voltage of 3.3V but greater than the first voltage of 1.885V), the first storage drive 130-1 (i.e., the storage drive #0) may be determined as the first type storage drive (i.e., the SATA/SAS HDD), and the second storage drive 130-2 (i.e., the storage drive #1) may be determined as the second type storage drive (i.e., the NVMe SSD). When the voltage received is about 2.64V (which is a third voltage smaller than the positive voltage of 3.3V but greater than the second voltage of 2.17V), the first storage drive 130-1 (i.e., the storage drive #0) may be determined as the second type storage drive (i.e., the NVMe SSD), and the second storage drive 130-2 (i.e., the storage drive #1) may be determined as the first type storage drive (i.e., the SATA/SAS HDD). When the voltage received is about 3.3V (i.e., the positive voltage), each of the first storage drive 130-1 (i.e., the storage drive #0) and the second storage drive 130-2 (i.e., the storage drive #1) may be determined as the second type storage drive (i.e., the NVMe SSD).

Figure 7:
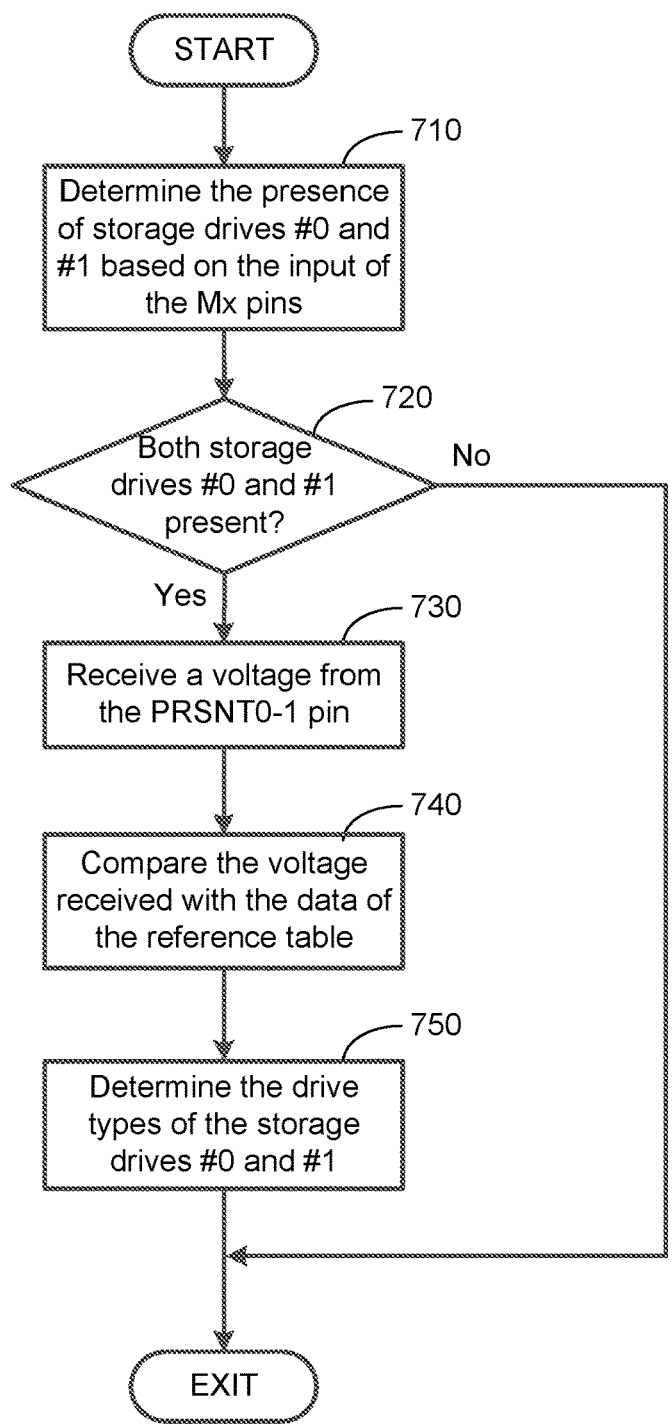
FIG. 7 depicts a flowchart of the operation of the storage detection module of the controller according to certain embodiments of the present disclosure.

FIG. 7 depicts a flowchart of the operation of the storage detection module of the controller according to certain embodiments of the present disclosure. In certain embodiments, the method as shown in FIG. 7 may be implemented by a system as shown in FIGS. 1 and 5 for detecting the drive types of storage drives 130 connected to a controller 110. In certain embodiments, the method may be implemented by the storage detection module 152 of the controller 110 of the system 100 as shown in FIGS. 1 and 2. It should be particularly noted that, unless otherwise stated in the present disclosure, the steps of the method may be arranged in a different sequential order, and are thus not limited to the sequential order as shown in FIG. 7.

As shown in FIG. 7, at procedure 710, the storage detection module 152 of the controller 110 may determine the presence of the storage drives #0 and #1 based on the inputs of the Mx pins 118-1 and 118-2, as shown in FIG. 5. The detailed process for determining the presence of each of the storage drives 130 may be referred to descriptions about FIG. 4. At procedure 720, the storage detection module 152 determines whether both storage drives #0 and #1 are present. If one or both storage drives #0 and #1 are not present, the process ends.

When both storage drives #0 and #1 are present, at procedure 730, the storage detection module 152 receives a voltage from the PRSNT0-1 pin 118-3. At procedure 740, the storage detection module 152 compares the voltage received from the PRSNT0-1 pin 118-3 with the data of the reference table as shown in FIG. 6. At procedure 750, based on the comparison result, the storage detection module 152 may determine the drive types of each of the storage drives #0 and #1 as either the first type storage drive (i.e., the SATA/SAS HDD) or the second type storage drive (i.e., the NVMe SSD).

As discussed above, when the system and method as described is used for detecting the drive types of the storage drives, the MG9094 controller 110 requires only 2*N Mx pins and N PRSNT# pins 118 and N corresponding detecting circuits to support up to 2*N storage drives 130. In other words, the total number of the pins 118 of the controller 110 used for storage detection purposes are reduced to the 3*N pins (including the 2*N Mx pins and the N PRSNT# pins 118) to support up to 2*N storage drives 130.

In a further aspect, the present disclosure is related to a non-transitory computer readable medium storing computer executable code. The code, when executed at a processor of a controller, may perform the method as described above. In certain embodiments, the non-transitory computer readable medium may include, but not limited to, any physical or virtual storage media storing the firmware of the controller. In certain embodiments, the non-transitory computer readable medium may be implemented as the non-volatile memory 118 of the controller 110 as shown in FIG. 2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for detecting types of storage drives connected to a controller, comprising:
providing a backplane enclosure system comprising:
a controller comprising a plurality of pins, wherein the pins comprise N analog pins, and N is a positive integer;
N detecting circuits, each being electrically connected to a corresponding one of the N analog pins of the controller; and
2*N storage drives configured to be connected to and controlled by the controller, wherein each of the N analog pins is configured to be connected to two of the 2*N storage drives via a corresponding one of the detecting circuits for detecting a drive type of each of the two of the 2*N storage drives;
receiving, by the controller, a voltage from each of the N analog pins; and
determining, by the controller, the drive type of each of the two of the 2*N storage drives based on the voltage received from each of the N analog pins.

2. The method as claimed in claim 1, wherein the controller is a backplane controller or an enclosure management controller.

3. The method as claimed in claim 1, wherein each of the N analog pins is a PRSNT# pin, and each of the 2*N storage drives has a PRSNT# pin being electrically connected to one of the N PRSNT# pins of the controller via the corresponding detecting circuit.

4. The method as claimed in claim 3, wherein each of the 2*N storage drives is a first type storage drive or a second type storage drive, wherein the PRSNT# pin of the first type storage drive is grounded, and the PRSNT# pin of the second type storage drive is in a no-connect status and floating.

5. The method as claimed in claim 4, wherein the first type storage drive is a Serial AT Attachment (SATA) or Serial Attached SCSI (SAS) storage drive, and the second type storage drive is a Non-Volatile Memory Express (NVMe) storage drive.

6. The method as claimed in claim 5, wherein for each of the N analog pins, the corresponding detecting circuit comprises:
a first resistor having a first end electrically connected to the analog pin, and a second end electrically connected to a voltage source providing a positive voltage;
a second resistor having a first end electrically connected to the analog pin, and a second end configured to be electrically connected to the PRSNT# pin of a first storage drive connected to the analog pin via the corresponding detecting circuit; and
a third resistor having a first end electrically connected to the analog pin, and a second end configured to be electrically connected to the PRSNT# pin of a second storage drive connected to the analog pin via the corresponding detecting circuit;
wherein the third resistor has a greater resistance than that of the second resistor, and the second resistor has a greater resistance than that of the first resistor.

7. The method as claimed in claim 6, wherein for each of the N analog pins, the drive type of each of the two of the 2*N storage drives are determined based on the voltage received from the analog pins by:
when the voltage received is the positive voltage, determining each of the first storage drive and the second storage drive as the second type storage drive;
when the voltage received is a first voltage smaller than the positive voltage, determining each of the first storage drive and the second storage drive as the first type storage drive;
when the voltage received is a second voltage between the first voltage and the positive voltage, determining the first storage drive as the first type storage drive, and the second storage drive as the second type storage drive; and
when the voltage received is a third voltage between the second voltage and the positive voltage, determining the first storage drive as the second type storage drive, and the second storage drive as the first type storage drive.

8. The method as claimed in claim 7, wherein:
the resistance of the first resistor is 1K ohm;
the resistance of the second resistor is 2K ohm;
the resistance of the third resistor is 4K ohm;
the positive voltage is about 3.3V;
the first voltage is about 1.885V;
the second voltage is about 2.17V; and
the third voltage is about 2.64V.

9. The method as claimed in claim 8, wherein the pins of the controller further comprise 2*N Mx pins, and each of the 2*N storage drives has a GND/IFDET# pin being electrically connected to one of the 2*N Mx pins of the controller via a reference circuit for detecting presence of the storage drive, wherein the GND/IFDET# pin of each of the 2*N storage drives is grounded.

10. The method as claimed in claim 9, further comprising:
for each of the 2*N Mx pins, determining, by the controller, presence of a corresponding storage drive based on an input to the Mx pin by:
when the input to the Mx pin is a positive query voltage, determining that a corresponding storage drive is present; and
when the Mx pin receives no query voltage, determining that the corresponding storage drive is not present.

11. The method as claimed in claim 10, wherein each of the 2*N storage drives further has a RDYLED pin being electrically connected to one of the 2*N Mx pins of the controller via the reference circuit for detecting activity of the storage drive, wherein for each of the 2*N Mx pins, the reference circuit comprises:
a first 10K ohm resistor having a first end electrically connected to the Mx pin, and a second end;
a second 10K ohm resistor having a first end electrically connected to the Mx pin, and a second end configured to be electrically connected to the GND/IFDET# pin of the corresponding storage drive; and
a third 10K ohm resistor having a first end electrically connected to the Mx pin, and a second end configured to be electrically connected to the RDYLED pin of the corresponding storage drive, wherein
when the corresponding storage drive is present, the second end of the first 10K ohm resistor is electrically connected to a voltage source providing a voltage of about +3.3V, the second end of the second 10K ohm resistor is electrically connected to the GND/IFDET# pin of the corresponding storage drive, and the second end of the third 10K ohm resistor is electrically connected to the RDYLED pin of the corresponding storage drive; and
when the corresponding storage drive is not present, the second end of the first 10K ohm resistor is grounded.

12. A system, comprising:
a controller comprising a processor, a plurality of pins, and a memory storing computer executable code, wherein the pins comprise N analog pins, and N is a positive integer;
N detecting circuits, each being electrically connected to a corresponding one of the N analog pins of the controller; and
2*N storage drives configured to be connected to and controlled by the controller, wherein each of the N analog pins is configured to be connected to two of the 2*N storage drives via a corresponding one of the detecting circuits for detecting a drive type of each of the two of the 2*N storage drives;
wherein the computer executable code, when executed at the processor, is configured to:
receive a voltage from each of the N analog pins; and
determine, based on the voltage received from each of the N analog pins, the drive type of each of the two of the 2*N storage drives.

13. The system as claimed in claim 12, wherein the controller is a backplane controller or an enclosure management controller.

14. The system as claimed in claim 12, wherein each of the N analog pins is a PRSNT# pin, and each of the 2*N storage drives has a PRSNT# pin being electrically connected to one of the N PRSNT# pins of the controller via the corresponding detecting circuit.

15. The system as claimed in claim 14, wherein
each of the 2*N storage drives is a first type storage drive or a second type storage drive;

the first type storage drive is a Serial AT Attachment (SATA) or Serial Attached SCSI (SAS) storage drive;
the second type storage drive is a Non-Volatile Memory Express (NVMe) storage drive;
the PRSNT# pin of the first type storage drive is grounded; and
the PRSNT# pin of the second type storage drive is in a no-connect status and floating.

16. The system as claimed in claim 15, wherein for each of the N analog pins, the corresponding detecting circuit comprises:
a first resistor having a first end electrically connected to the analog pin, and a second end electrically connected to a voltage source providing a positive voltage;
a second resistor having a first end electrically connected to the analog pin, and a second end configured to be electrically connected to the PRSNT# pin of a first storage drive connected to the analog pin via the corresponding detecting circuit; and
a third resistor having a first end electrically connected to the analog pin, and a second end configured to be electrically connected to the PRSNT# pin of a second storage drive connected to the analog pin via the corresponding detecting circuit;
wherein the third resistor has a greater resistance than that of the second resistor, and the second resistor has a greater resistance than that of the first resistor.

17. The system as claimed in claim 16, wherein for each of the N analog pins, the computer executable code is configured to determine the drive type of each of the two of the 2*N storage drives based on the voltage received from the analog pins by:
when the voltage received is the positive voltage, determining each of the first storage drive and the second storage drive as the second type storage drive;
when the voltage received is a first voltage smaller than the positive voltage, determining each of the first storage drive and the second storage drive as the first type storage drive;
when the voltage received is a second voltage between the first voltage and the positive voltage, determining the first storage drive as the first type storage drive, and the second storage drive as the second type storage drive; and
when the voltage received is a third voltage between the second voltage and the positive voltage, determining the first storage drive as the second type storage drive, and the second storage drive as the first type storage drive.

18. The system as claimed in claim 17, wherein:
the resistance of the first resistor is 1K ohm;
the resistance of the second resistor is 2K ohm;
the resistance of the third resistor is 4K ohm;
the positive voltage is about 3.3V;
the first voltage is about 1.885V;
the second voltage is about 2.17V; and
the third voltage is about 2.64V.

19. The system as claimed in claim 18, wherein the pins of the controller further comprise 2*N Mx pins, and each of the 2*N storage drives has a GND/IFDET# pin being electrically connected to one of the 2*N Mx pins of the controller via a reference circuit for detecting presence of the storage drive, wherein the GND/IFDET# pin of each of the 2*N storage drives is grounded, and wherein the computer executable code is configured to determine, for each of the 2*N Mx pins, presence of a corresponding storage drive based on an input to the Mx pin by:

when the input to the Mx pin is a positive query voltage, determining that a corresponding storage drive is present; and when the Mx pin receives no query voltage, determining that no corresponding storage drive is present.

20. The system as claimed in claim 19, wherein each of the 2*N storage drives further has a RDYLED pin being electrically connected to one of the 2*N Mx pins of the controller via the reference circuit for detecting activity of the storage drive, wherein for each of the 2*N Mx pins, the reference circuit comprises:

a first 10K ohm resistor having a first end electrically connected to the Mx pin, and a second end;

a second 10K ohm resistor having a first end electrically connected to the Mx pin, and a second end configured to be electrically connected to the GND/IFDET# pin of the corresponding storage drive; and a third 10K ohm resistor having a first end electrically connected to the Mx pin, and a second end configured to be electrically connected to the RDYLED pin of the corresponding storage drive, wherein when the corresponding storage drive is present, the second end of the first 10K ohm resistor is electrically connected to a voltage source providing a voltage of about +3.3V, the second end of the second 10K ohm resistor is electrically connected to the GND/IFDET# pin of the corresponding storage drive, and the second end of the third 10K ohm resistor is electrically connected to the RDYLED pin of the corresponding storage drive; and when the corresponding storage drive is not present, the second end of the first 10K ohm resistor is grounded.

* * * * *